United States Patent Office 3,272,763
Patented Sept. 13, 1966

3,272,763
POLYMERIZATION CATALYSIS
William E. Erner, Wilmington, Del., Adalbert Farkas, Media, Pa., and Harold Graboyes, Philadelphia, Pa., assignors to Air Products and Chemicals, Inc., a corporation of Delaware
No Drawing. Original application Feb. 11, 1959, Ser. No. 792,479, now Patent No. 3,037,026, dated May 29, 1962. Divided and this application Nov. 22, 1961, Ser. No. 160,682
2 Claims. (Cl. 260—2.5)

This is a division of Serial Number 792,479, filed February 11, 1959, now Patent Number 3,037,026, granted May 29, 1962.

The present invention relates to the use of molecular addition compounds of diazabicyclo-octane as catalysts and promoters in condensation reactions, particularly in the formation of plastics.

Some of the disclosure of said parent case is omitted as irrelevant to the claims herein.

The diazabicyclo-octane-hydroquinone addition complex corresponds to the probable formula:

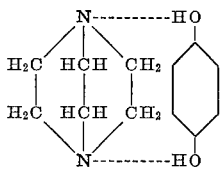

It is a white powdery material containing molar proportions of the two components. The complex melts at 250–260° C. and is soluble in the following solvents:

| Solvent | Temp. ° F. | Solub. g./100 ml. |
|---|---|---|
| Acetone | 80 | 0.27 |
| Methylethyl ketone | 77 | 0.32 |
| Acetone n-heptane (1:1) | 77 | 0.094 |

The complex is split in aqueous acid, releasing the hydroquinone which can be removed by solvent extraction, steam distillation, or filtration. By addition of alkali to the aqueous acid solution, concentrating, and then fractionally distilling, the diazabicyclo-octane base is recovered in anhydrous form.

The diazabicyclo-octane-hydroquinone complex is useful in basic catalysis where the action of the base is desired to be delayed (blocked) such as in certain formulations for production of polyurethane foams and plastics and in curing of epoxy resins.

Example I

The diazabicyclo-octane-hydroquinone complex can be used as a curing agent for liquid epoxy resins. Thus a liquid epoxy resin which does not solidify by heating at 200° C. in the absence of catalyst, when admixed with about 1 to 10% by weight of the diazabicyclo-octane-hydroquinone complex and heated for one hour at 180 to 200° C., is transformed to a hard glassy resin of acceptable heat distortion characteristics. Using 10% of the diazabicyclo-octane as free base by weight of the same liquid resin, sticky to hard products were obtained in one hour at 100° C., while hard and glassy products were obtained by one hour heating at 135° C. The use of the complex is preferred in those instances in which the higher temperature cure is desired, particularly in pre-mix formulations of the liquid resin and curing agent, which remains inactive on storage at room temperature but is readily cured at elevated temperature.

Instead of the hydroquinone complex of the diazabicyclo-octane as a curing agent for the epoxy resins, other acid addition complexes of the diazabicyclo-octane can be similarly employed. A known commercial liquid epoxy resin of the novolac type (Epiphen) containing the polyfunctional grouping

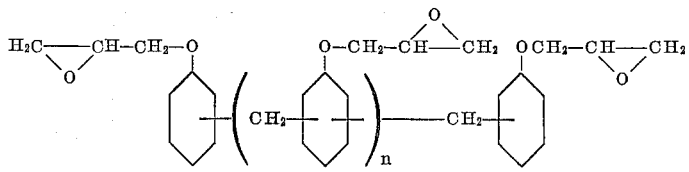

has an average molecular weight of 350–600, and is capable of cross-linking through the several epoxide rings. Such resin was mixed with 10% by weight of diazabicyclo-octane-BF$_3$ complex and cured for one hour at 200° C. A glassy resin of good hardness was obtained.

The BF$_3$ complex of diazabicyclo-octane is readily prepared by passing gaseous BF$_3$ into an ethanol solution of the diazabicyclo-octane to precipitate the complex. This addition compound is soluble in water but insoluble in organic solvents. It decomposes at 300° C. without melting.

In polyurethane formulations the hydroquinone complex or the BF$_3$ complex of the diazabicyclo-octane can be employed in quantities of about 0.1 to 1.0% by weight of the composition. Because of the blocked basicity of the tertiary N atoms delaying initiation of the full catalytic activity of the diazabicyclo-octane, considerable variation in desired properties of the polyurethane resin can be obtained by control of extent of cross-linking and the rate and timing of gas evolution to produce foamed or cellular products. A typical formulation for a rigid urethane foam is as follows:

Parts by weight
Polyhydroxy polyester compound
  (acid No. 15–20) _____ 100
Water _____ 2
Diazabicyclo-octane-hydroquinone _____ 0.5

The above components are thoroughly mixed and tolylene diisocyanate added in the amount of about 80 parts by weight in a suitable continuous mixer. The mixed composition is promptly poured into a mold. Curing of the obtained foam product can be accelerated, if desired, by moderate heating.

Obviously many modifications and variations of the invention hereinbefore set forth may be made without departing from the spirit and scope thereof and therefore only such limitations should be imposed as are indicated in the appended claims.

What is claimed is:

1. The method of preparing a polyepoxy plastic which includes the steps of preparing a mixture consisting of about 90–99% liquid epoxy resin containing a plurality of 1,2-epoxy groups and about 1–10% of the hydroquinone molecular addition complex of diazabicyclooctane corresponding to the formula:

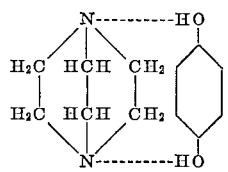

and heating the mixture for about one hour at a temperature within the range from about 180° C. to about 200° C. to produce a polyepoxy plastic, said mixture of liquid epoxy resin and complex having the advantageous property of remaining inactive during storage at ambient conditions.

2. The method of preparing a polyurethane plastic which includes the steps of preparing a mixture consisting of about 80 parts by weight of tolylene diisocyanate, about 100 parts of polyhydroxypolyester, about 2 parts of water and about 0.5 part of the hydroquinone molecular addition complex of diazabicyclo-octane corresponding to the formula:

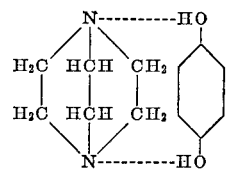

and pouring said mixture into a mold in which the polyurethane foam plastic is cured by the exothermic reaction among the hydroxy and isocyanato groups, which reaction is catalyzed at an increasing rate at the at least partly autogenetically increasing temperatures by such addition complex.

References Cited by the Examiner

UNITED STATES PATENTS

| | | | |
|---|---|---|---|
| 2,717,885 | 9/1955 | Greenlee | 260—47 |
| 2,866,768 | 12/1958 | Balstad | 260—47 |
| 2,937,176 | 5/1960 | Herrick | 260—250 |
| 3,037,026 | 5/1962 | Erner et al. | 260—47 |

OTHER REFERENCES

Lee et al.: "Epoxy Resins," page 15 relied on, McGraw-Hill Book Company, Inc., New York, N.Y., July 7, 1957.

WILLIAM H. SHORT, *Primary Examiner.*
JOSEPH R. LIBERMAN, *Examiner.*
T. D. KERWIN, *Assistant Examiner.*